(12) United States Patent
Makita et al.

(10) Patent No.: US 11,095,814 B2
(45) Date of Patent: Aug. 17, 2021

(54) IMAGE PROCESSING APPARATUS AND IMAGE PROCESSING METHOD

(71) Applicant: CANON KABUSHIKI KAISHA, Tokyo (JP)

(72) Inventors: Koji Makita, Yokohama (JP); Shunsuke Nakano, Inagi (JP); Kotaro Yano, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 167 days.

(21) Appl. No.: 16/413,678

(22) Filed: May 16, 2019

(65) Prior Publication Data
US 2019/0364202 A1 Nov. 28, 2019

(30) Foreign Application Priority Data

May 25, 2018 (JP) .............................. JP2018-100865
Feb. 6, 2019 (JP) .............................. JP2019-019961

(51) Int. Cl.
*H04N 5/232* (2006.01)
*G06K 9/62* (2006.01)
*G06F 21/32* (2013.01)

(52) U.S. Cl.
CPC ......... *H04N 5/23232* (2013.01); *G06F 21/32* (2013.01); *G06K 9/6217* (2013.01)

(58) Field of Classification Search
CPC .............. G06K 9/00288; G06K 9/4609; G06T 2207/10016
See application file for complete search history.

(56) References Cited

U.S. PATENT DOCUMENTS

| | | | |
|---|---|---|---|
| 9,691,155 B2 | 6/2017 | Tojo et al. | |
| 9,773,322 B2 | 9/2017 | Uchiyama et al. | |
| 9,864,902 B2 | 1/2018 | Nakano et al. | |
| 10,140,726 B2 | 11/2018 | Nishino et al. | |
| 2009/0309700 A1* | 12/2009 | Fujita ................. | G06K 9/00288 340/5.82 |
| 2014/0010459 A1* | 1/2014 | Sumi ................... | G06K 9/00221 382/195 |
| 2014/0112553 A1* | 4/2014 | Yamaguchi ........ | G06K 9/00362 382/118 |
| 2016/0267339 A1 | 9/2016 | Nakano et al. | |
| 2017/0193681 A1 | 7/2017 | Nomoto et al. | |
| 2017/0263008 A1* | 9/2017 | Tojo ......................... | G06T 7/30 |
| 2018/0150971 A1 | 5/2018 | Adachi et al. | |

FOREIGN PATENT DOCUMENTS

JP 5787686 B 9/2015

* cited by examiner

*Primary Examiner* — Ross Varndell
(74) *Attorney, Agent, or Firm* — Carter, DeLuca & Farrell LLP

(57) ABSTRACT

A likelihood of each of a plurality of registered images belonging to a same group for an input image is calculated, and a prescribed number of registered images is selected from a top ranking in descending order of likelihood among the plurality of registered images as the authentication result for the input image. Based on a likelihood of a registered image included in an authentication result for an input image of a first frame and a likelihood of a registered image included in an authentication result for an input image of a second frame being previous to the first frame, one of the authentication result for the input image of the first frame and the authentication result for the input image of the second frame is displayed.

8 Claims, 15 Drawing Sheets

FIG. 5

| REGISTERED IMAGE NAME | LIKELIHOOD |
|---|---|
| A | 140 |
| B | 130 |
| C | 120 |
| D | 110 |
| E | 100 |
| F | 90 |
| G | 80 |
| H | 70 |
| I | 60 |
| J | 50 |
| K | 40 |
| L | 30 |
| M | 20 |
| N | 10 |

FIG. 6

| GROUP NAME | REGISTERED IMAGE |
|---|---|
| FREQUENT CUSTOMER 1 | A, B, C, D, E, F, G |
| ALERT REQUIRED 1 | H, I, J, K, L, M, N |

FIG. 7

| GROUP NAME | TOP 3 |
|---|---|
| FREQUENT CUSTOMER 1 | 1 : A, 2 : B, 3 : C |
| ALERT REQUIRED 1 | 1 : H, 2 : I, 3 : J |

FIG. 9

LIKELIHOOD IN PREVIOUS FRAME

| REGISTERED IMAGE NAME | LIKELIHOOD |
|---|---|
| A | 140 |
| B | 130 |
| C | 120 |
| D | 110 |
| E | 100 |
| F | 90 |
| G | 80 |
| H | 70 |
| I | 60 |
| J | 50 |
| K | 40 |
| L | 30 |
| M | 20 |
| N | 10 |

LIKELIHOOD IN CURRENT FRAME

| REGISTERED IMAGE NAME | LIKELIHOOD |
|---|---|
| A | 140 |
| B | 130 |
| C | 120 |
| D | 200 |
| E | 100 |
| F | 90 |
| G | 80 |
| H | 70 |
| I | 60 |
| J | 50 |
| K | 40 |
| L | 30 |
| M | 20 |
| N | 200 |

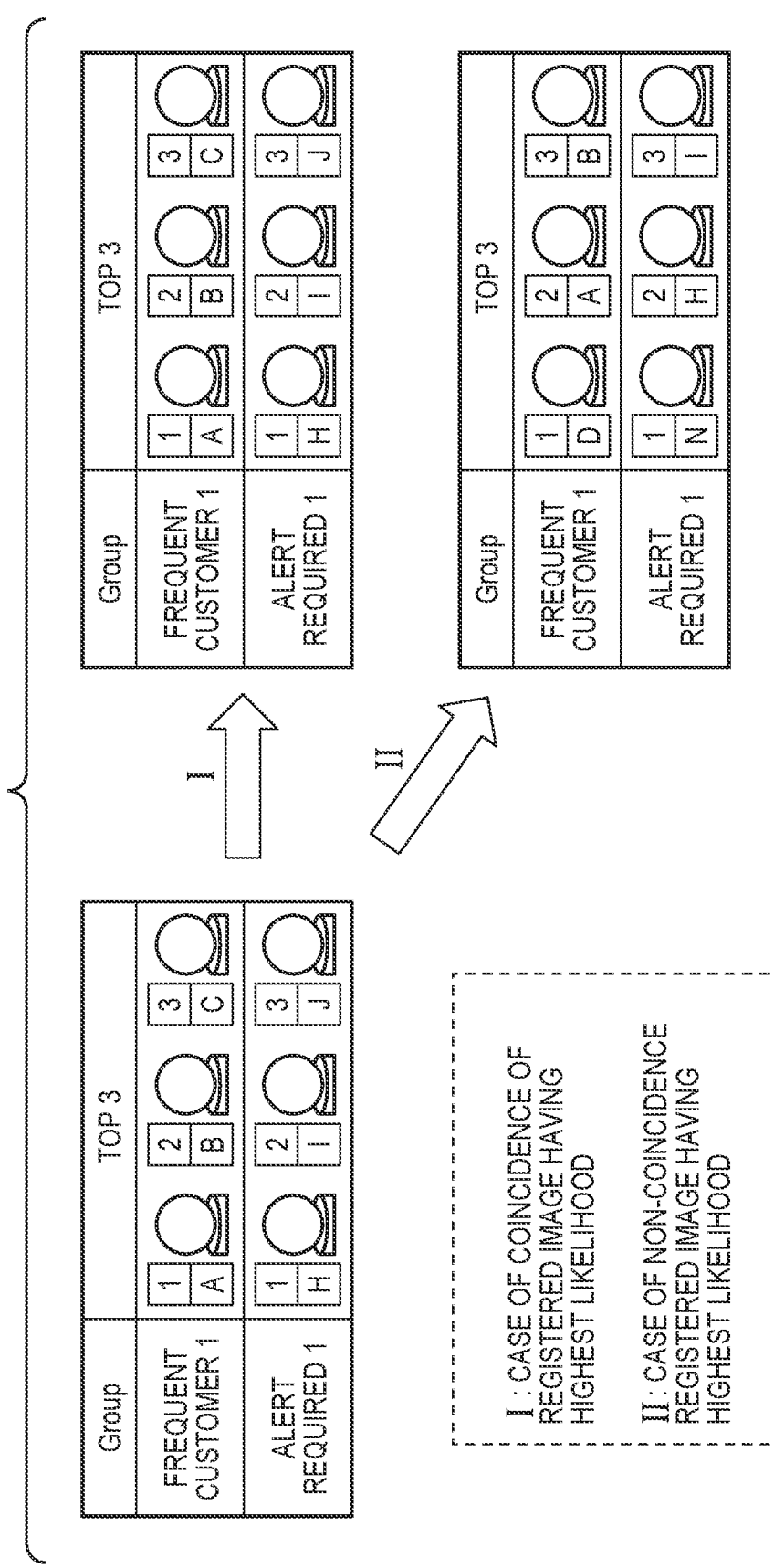

FIG. 12A

| GROUP NAME | REGISTERED IMAGE |
|---|---|
| MALE IN 20s | A, B, C |

FIG. 12B

| REGISTERED IMAGE NAME | LIKELIHOOD |
|---|---|
| A | $L_A^{-1}$ (=140) |
| B | $L_B^{-1}$ (=10) |
| C | $L_C^{-1}$ (=80) |

FIG. 12C

| REGISTERED IMAGE NAME | LIKELIHOOD |
|---|---|
| A | $L_A^{0}$ (=40) |
| B | $L_B^{0}$ (=130) |
| C | $L_C^{0}$ (=20) |

$$L = (L_A^{-1} + L_B^{-1} + L_C^{-1} + L_A^{0} + L_B^{0} + L_C^{0})/6$$
$$= (140 + 10 + 80 + 40 + 130 + 20)/6$$
$$= 70$$

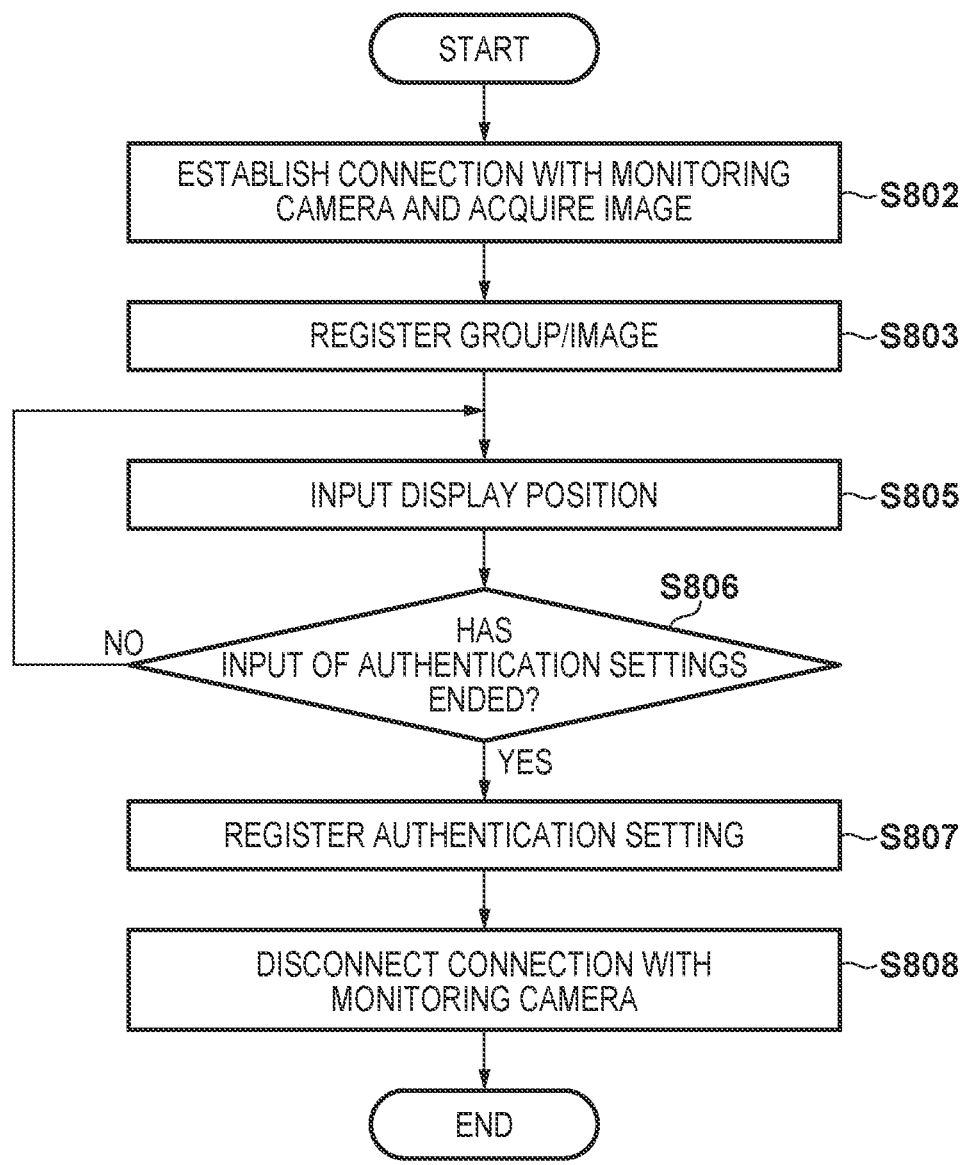

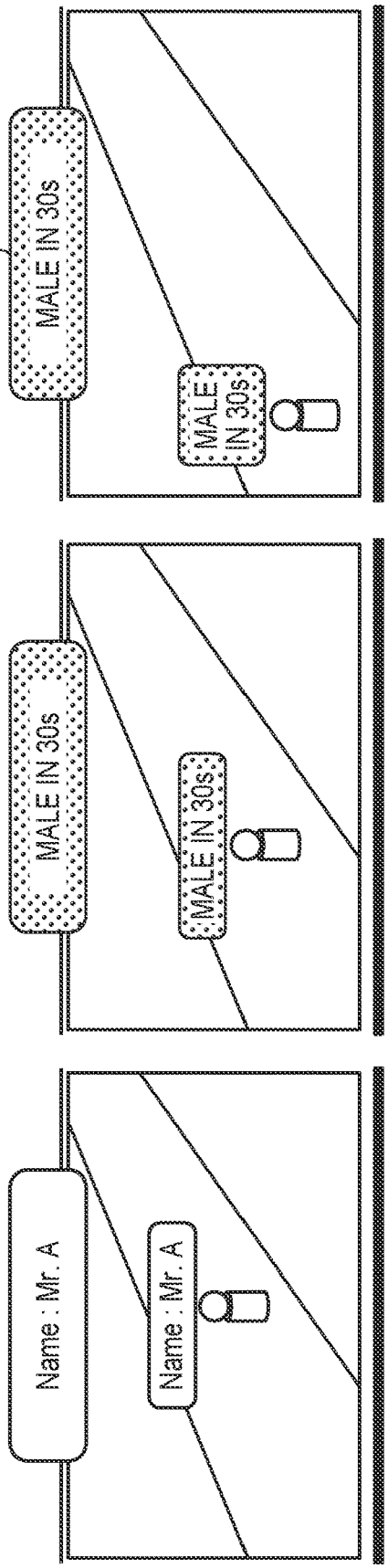

IMAGE PROCESSING APPARATUS AND IMAGE PROCESSING METHOD

BACKGROUND OF THE INVENTION

Field of the Invention

The present invention relates to authentication technology for input images.

Description of the Related Art

A known technology in a monitoring system utilizes an image analysis technology to detect the face of a person being present in an image. Also, a known technology in an image processing system performs comparison of two facial images to calculate a likelihood of whether two facial images are of the same person's face. Japanese Patent No. 5787686 discloses, using these technologies, a technology in which a face detected in a monitoring system is compared with previously registered faces in the system to perform personal identification and display a registered image of a likely person.

Unfortunately, due to frequent changes in the authentication result for each frame, there are cases in which, in the authentication result displayed for each frame, a person having the likelihood to be displayed becomes versatile, or display/non-display are frequently switched, eventually making it hard to identify the person. While there are cases, depending on the applications of facial authentication, in which there is a demand for, even if it is not possible to narrow down the person to a specific one person, a prompt recognition of the possibility of the presence of a crucial person who belongs to a specific group.

SUMMARY OF THE INVENTION

The present invention provides a technology in which an authentication result for an input image is displayed in an easily viewable manner.

According to the first aspect of the present invention, there is provided an image processing apparatus comprising: an acquisition unit configured to sequentially acquire an input image; a selection unit configured to calculate a likelihood of each of a plurality of registered images belonging to a same group for an input image, and select a prescribed number of registered images from a top ranking in descending order of likelihood among the plurality of registered images as the authentication result for the input image; and a display control unit configured to display, based on a likelihood of a registered image included in an authentication result for an input image of a first frame and a likelihood of a registered image included in an authentication result for an input image of a second frame being previous to the first frame, one of the authentication result for the input image of the first frame and the authentication result for the input image of the second frame.

According to the second aspect of the present invention, there is provided an image processing apparatus comprising: an acquisition unit configured to sequentially acquire an input image; and a display control unit configured to display a name of a group, as an authentication result for an input image of a first frame, in a case where an average value of likelihood of each of a plurality of registered images within the group for the input image of the first frame and a likelihood of each of the plurality of registered images for an input image of a second frame being previous to the first frame is more than a predetermined threshold.

According to the third aspect of the present invention, there is provided an image processing apparatus comprising: an acquisition unit configured to acquire respective likelihoods of a plurality of registered person images for an input image for an authentication; an output unit configured to output, as an authentication result, a name of a group which includes a first person having the highest likelihood for a current input image in a case where none of the respective likelihoods is more than a predetermined threshold and the first person is different than a second person corresponding to a registered person image having the highest likelihood for a previous input image.

According to the fourth aspect of the present invention, there is provided an image processing apparatus comprising: an acquisition unit configured to acquire a likelihood of a person image for an input image for an authentication; an output unit configured to output a name of a group as an authentication result for the input image in a case where a number of images to the input image after a person has appeared is less than a predetermined threshold, and output at least a name of a person as an authentication result for the input image in a case where the number of images to the input image after a person has appeared is more than a predetermined threshold.

According to the fifth aspect of the present invention, there is provided an image processing method performed by an image processing apparatus, the method comprising: sequentially acquiring an input image; calculating a likelihood of each of a plurality of registered images belonging to a same group to an input image and selecting a prescribed number of registered images from a top ranking in descending order of likelihood among the plurality of registered images as the authentication result for the input image; and displaying, based on a likelihood of a registered image included in an authentication result for an input image of a first frame and a likelihood of a registered image included in an authentication result for an input image of a second frame being previous to the first frame, one of the authentication result for the input image of the first frame and the authentication result for the input image of the second frame.

According to the sixth aspect of the present invention, there is provided an image processing method performed by an image processing apparatus, the method comprising: sequentially acquiring an input image; and displaying a name of a group, as an authentication result for an input image of a first frame, in a case where an average value of a likelihood of each of a plurality of registered images within the group for the input image of the first frame and a likelihood of each of the plurality of registered images for an input image of a second frame being previous to the first frame is more than a predetermined threshold.

According to the seventh aspect of the present invention, there is provided an image processing method comprising: acquiring respective likelihoods of a plurality of registered person images for an input image for an authentication; performing output of, as an authentication result, a name of a group which includes a first person having the highest likelihood for a current input image in a case where none of the respective likelihoods is more than a predetermined threshold and the first person is different than a second person corresponding to a registered person image having the highest likelihood for a previous input image.

According to the eighth aspect of the present invention, there is provided an image processing method comprising: acquiring a likelihood of a person image for an input image for an authentication; performing output of a name of a group as an authentication result for the input image in a case where a number of images to the input image after a person has appeared is less than a predetermined threshold, and output of at least a name of a person as an authentication result for the input image in a case where the number of images to the input image after a person has appeared is more than a predetermined threshold.

Further features of the present invention will become apparent from the following description of exemplary embodiments (with reference to the attached drawings).

BRIEF DESCRIPTION OF THE DRAWINGS

FIG. 5 is a diagram illustrating an example of the likelihood of each registered image with respect to a facial image.

FIG. 6 is a diagram illustrating an example of a group to which each of the registered images belong.

FIG. 7 is a diagram illustrating an example of a selection result.

FIG. 9 is a diagram illustrating an example of the likelihood of each registered image determined for a previous frame and a current frame.

FIG. 11 is a diagram illustrating a specific example of a method of determining an authentication result by a determination unit 111.

FIGS. 12A to 12C are diagrams illustrating an example of a method of determining likelihood of person of category belonging to group.

FIG. 13 is a flowchart of a setting processing related to authentication by an authentication unit 2000.

FIG. 19 is a diagram illustrating a processing in accordance with a flowchart of FIG. 17.

DESCRIPTION OF THE EMBODIMENTS

Embodiments of the invention are described below with reference to the accompanying drawings. Note that the embodiments to be described below represent an example of a specific implementation of the present invention, which is one of the specific embodiments of the configurations described in the claims.

First Embodiment

Figure 15:
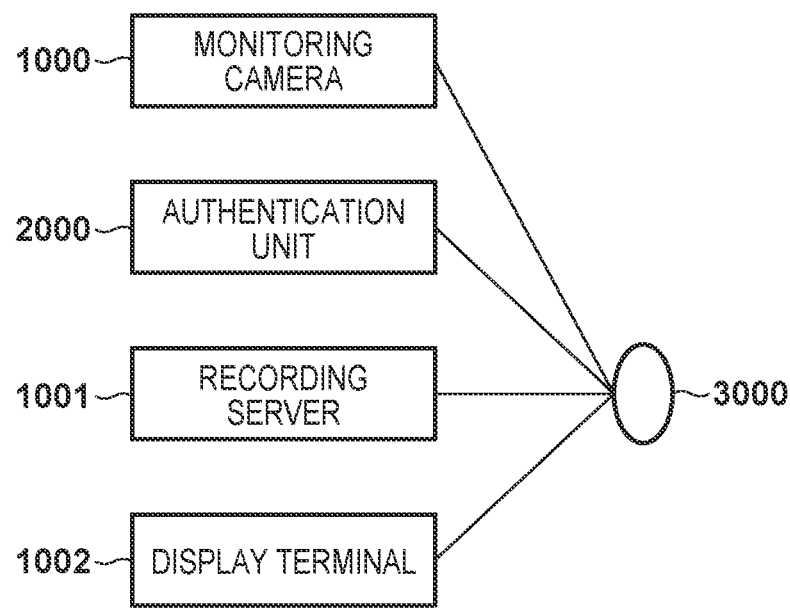
FIG. 15 is a diagram illustrating a configuration example of a monitoring system.

First, a configuration example of a monitoring system according to First Embodiment will be described with reference to FIG. 15. As illustrated in FIG. 15, the monitoring system according to First Embodiment includes a monitoring camera 1000, an authentication unit 2000, a recording server 1001, and a display terminal 1002, each connected to a network 3000 such as Local Area Network (LAN).

First, the monitoring camera 1000 will be described. The monitoring camera 1000, arranged at a prescribed position with a prescribed orientation to monitor the monitoring area, is configured to capture a moving image, or to capture a still image periodically/non-periodically. The monitoring camera 1000 is configured to sequentially transmit images of each of the captured frames (captured images), via the network 3000, to the recording server 1001. Note that the position and orientation of the monitoring camera 1000 is, but not limited to, a fixed position or posture.

Next, the recording server 1001 will be described. The recording server 1001 is configured to record the captured image of each of the frames received from the monitoring camera 1000, via the network 3000, to a memory device such as a hard disk.

Next, the authentication unit 2000 will be described. The authentication unit 2000 is an image processing apparatus configured to sequentially display the captured image of each of the frames recorded in the recording server 1001 and to authenticate a face of person in the captured images to display the result of the authentication. The authentication unit 2000 is also configured to transmit the result of the authentication performed on the captured image of each of the frames, via the network 3000, to the display terminal 1002.

Next, the display terminal 1002 will be described. The display terminal 1002 is configured to display the captured image of each of the frames recorded in the recording server 1001, and to display the results of the authentication for the captured image received, via the network 3000, from the authentication unit 2000.

Note that the configuration of the monitoring system illustrated in FIG. 15 represents one example. For example, although in FIG. 15, the monitoring camera 1000, the authentication unit 2000, the recording server 1001, and the display terminal 1002 are handled as mutually separate apparatuses, two or more of these apparatuses may be integrated into one apparatus. Next, a functional configuration example of the authentication unit 2000 will be described with reference to the block diagram of FIG. 1.

An acquisition unit 103 is configured to acquire a captured image from the monitoring camera 1000 or the recording server 1001. An input unit 104 serves as a user interface in which various types of operation inputs can be performed by user operation (e.g., various types of operation inputs related to authentication by the authentication unit 2000) to the authentication unit 2000. Such a user interface includes a keyboard, mouse, touch panel, or the like. A management unit 102 is configured to register and manage setting information (authentication setting) in the memory 198 set in accordance with the operation input performed by the user operating the input unit 104.

Figure 2:
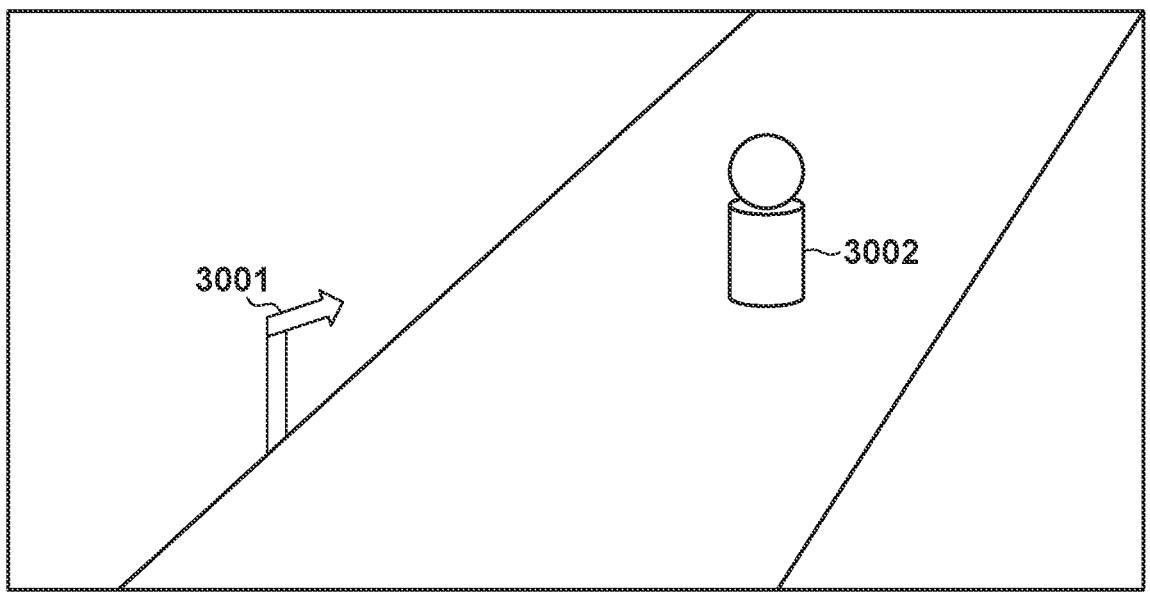
FIG. 2 is a diagram illustrating an arrangement of a monitoring camera 1000.
Figure 3:
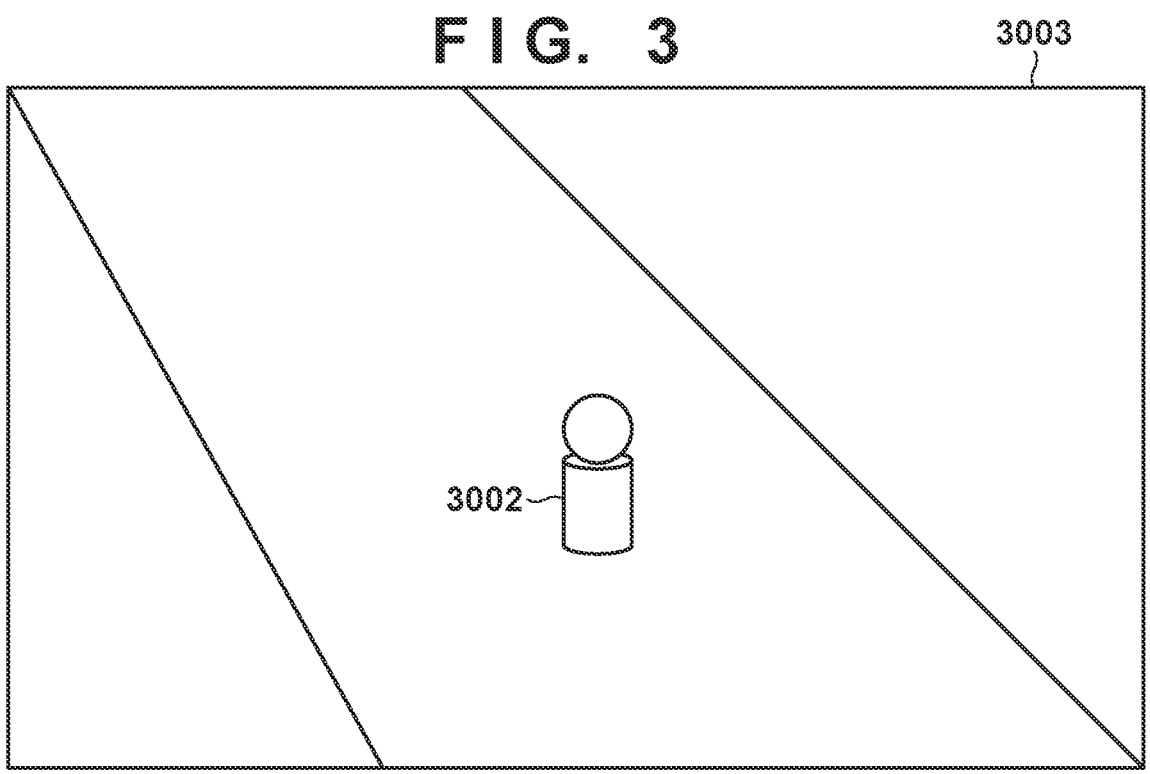
FIG. 3 is a diagram illustrating an example of a captured image.

A processing unit 105 is configured to perform authentication on the captured images acquired by the acquisition unit 103 based on the setting information managed by the management unit 102. Here, one example of a captured image is illustrated in FIG. 3, where the captured image has been captured by the monitoring camera 1000 disposed to be directed in a direction indicated by an arrow 3001, with a monitoring area including a person 3002 being at the position of the arrow 3001, as illustrated in FIG. 2. As illustrated in FIG. 3, a captured image 3003 contains the person 3002.

Figure 4:
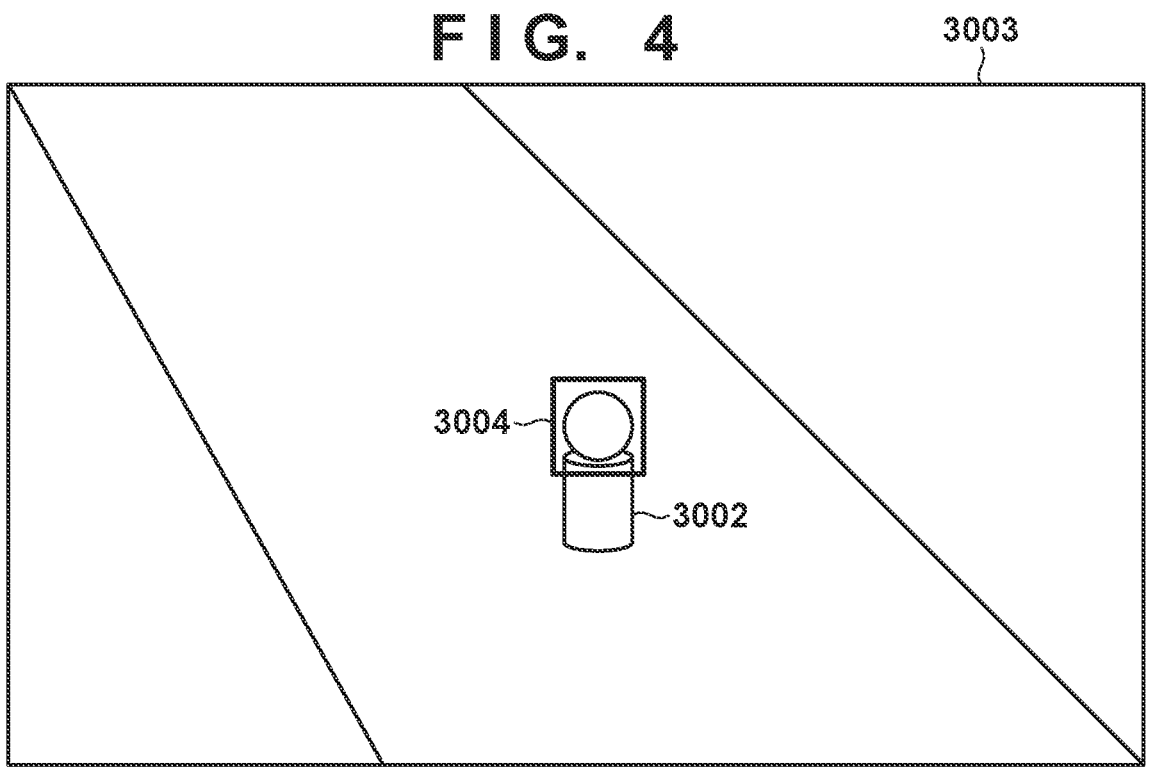
FIG. 4 is a diagram illustrating an example of detection of a facial image.

A face detector 109 is configured to detect an area of the face (facial area) of the person contained in the captured image acquired by the acquisition unit 103, and to extract the image in the facial area as a facial image (input image). In case when the acquisition unit 103 acquires the captured image 3003 in FIG. 3 from the recording server 1001, the face detector 109 detects a facial area 3004 of the person 3002 contained in the captured image 3003, as illustrated in FIG. 4. Note that the shape of the facial area is not limited to be a rectangular shape as illustrated in FIG. 4, and may be a non-rectangular shape, such as an elliptical shape.

A likelihood calculating unit 110 is configured to determine, for the facial image (the image in the facial area 3004 in the example of FIG. 4) extracted by the face detector 109, likelihoods (likelinesses) of the images (registered images) of the faces of various persons contained in the setting information managed by the management unit 102. Various methods are publicly known for determining a likelihood of one image with respect to the other image, and the determination method is not limited, in First Embodiment, to a specific likelihood calculating method. An example of the likelihood of each registered image with respect to the facial image is listed in FIG. 5.

FIG. 5 illustrates likelihood of each of fourteen registered images (registered images A to N) for the facial image. As illustrated in FIG. 6, among the registered images A to N, the registered images A to G belong to the group with the group name of "Frequent Customer 1", while the registered images H to N belong to the group with the group name of "Alert Required 1". Any one of the registered images A to G belonging to the group with the group name of "Frequent Customer 1" is the image of the face of the person corresponding to the "Frequent Customer 1", while any one of the registered images H to N belonging to the group with the group name of "Alert Required 1" is the image of the face of the person corresponding to the "Alert Required 1".

In this example, each of the groups to which registered images belonging is mutually exclusive, where registered images belonging to one group do not belong to other groups. However, a single registered image might belong to a plurality of groups.

The determination unit 111 is configured to determine the registered image to be displayed based on the calculation result of the likelihood of each of the registered images by the likelihood calculating unit 110. A display 106 is configured to display a captured image acquired by the acquisition unit 103 and a registered image determined for the captured image by the determination unit 111. A controller 199 is configured to control the overall operations of the authentication unit 2000. A memory 198 is configured to store the various information to be described below as being stored by the authentication unit 2000.

Next, a setting processing related to the authentication by the authentication unit 2000 will be described in accordance with the flowchart of FIG. 13. In step S802, the acquisition unit 103 connects to the monitoring camera 1000 using an image acquisition protocol, and acquires, after the connection is established, the captured images sequentially transmitted from the monitoring camera 1000.

In step S803, the management unit 102 registers setting information set by the user operating the input unit 104 in the memory 198. The user operates the input unit 104 to set one or more of "groups to which the registered images of persons of the same type belong" (to set, in the example of FIG. 5, the group with the group name of "Frequent Customer 1" and the group with the group name of "Alert Required 1"). Then, the management unit 102 classifies the registered images stored by the authentication unit 2000 into any one of the groups that have been set. In the example of FIG. 5, the registered images A to G are classified into the group with the group name of "Frequent Customer 1", while the registered images H to N are classified into the group with the group name of "Alert Required 1". Then, the management unit 102 registers the information related to the groups or registered images in the memory 198, such as a registered image classified into each of the groups, a group name of each of the groups, or the like, as the setting information.

In step S805, the management unit 102 causes the captured images acquired by the acquisition unit 103 to be displayed on the display 106, and performs display of an interface for setting the position and size of the display area for displaying the authentication result to be displayed for each of groups by the processing to be described below. The interface can be, for example, a boundary indicating the display area, where a user is allowed to set a desired display area by altering the size and position of the boundary using the input unit 104.

When the user enters a determination instruction for the display area using the input unit 104, the processing proceeds to step S807 via step S806, while the processing returns to step S805 via step S806 unless the user enters a determination instruction for the display area using the input unit 104.

In step S807, the management unit 102 registers the position and size of the display area, which have been set in step S805 in the memory 198 with including the position and size in the setting information described above. In step S808, the acquisition unit 103 disconnects the connection with the monitoring camera 1000.

Next, the processing (display control) will be described in accordance with the flowchart of FIG. 14, in which the authentication unit 2000 performs display of a captured image of each of the frames recorded in the recording server 1001 and performs display of the authentication result for the faces of the persons in the captured image.

In step S1401, the acquisition unit 103 acquires a captured image from the recording server 1001. In step S1402, the face detector 109 extracts a facial image of the person from the captured image acquired by the acquisition unit 103 in step S1401.

In step S1403, the likelihood calculating unit 110 determines the likelihood of each of the registered images managed by the management unit 102 to the facial image extracted from the captured image in step S1402. In step S1404, the controller 199 causes the display 106 to display the captured image acquired by the acquisition unit 103 in step S1401.

In step S1405, the determination unit 111 selects as a selection result, for each of groups, the n registered images (n is an integer of 2 or greater and is a prescribed number previously registered in the memory 198) from the top ranking in descending order of likelihood among the registered images belonging to each group. The following is an example of n=3, but is not limited thereto.

In the example of FIG. 5, the groups are consisted of two groups of a group with the group name of "Frequent Customer 1" and a group with the group name of "Alert Required 1", thus the three top ranking registered images for each of the two groups in descending order of likelihood (with the likelihood ranking of 1 to 3) are selected as the selection result.

As illustrated in FIG. 5, the registered image having the highest likelihood among the registered images A to G belonging to the group with the group name of "Frequent Customer 1" is a registered image A, the registered image having the second highest likelihood is a registered image B, and the registered image having the third highest likelihood is a registered image C. Therefore, as illustrated in FIG. 7, the selection result (TOP 3) corresponding to the group with the group name of "Frequent Customer 1" provides the registered images A, B, and C.

Similarly, as illustrated in FIG. 5, the registered image having the highest likelihood among the registered images H to N belonging to the group with the group name of "Alert Required 1" is a registered image H, the registered image having the second highest likelihood is a registered image I, and the registered image having the third highest likelihood is a registered image J. Therefore, as illustrated in FIG. 7, the selection result (TOP 3) corresponding to the group with the group name of "Alert Required 1" provides the registered image H, I, and J.

Figure 14:
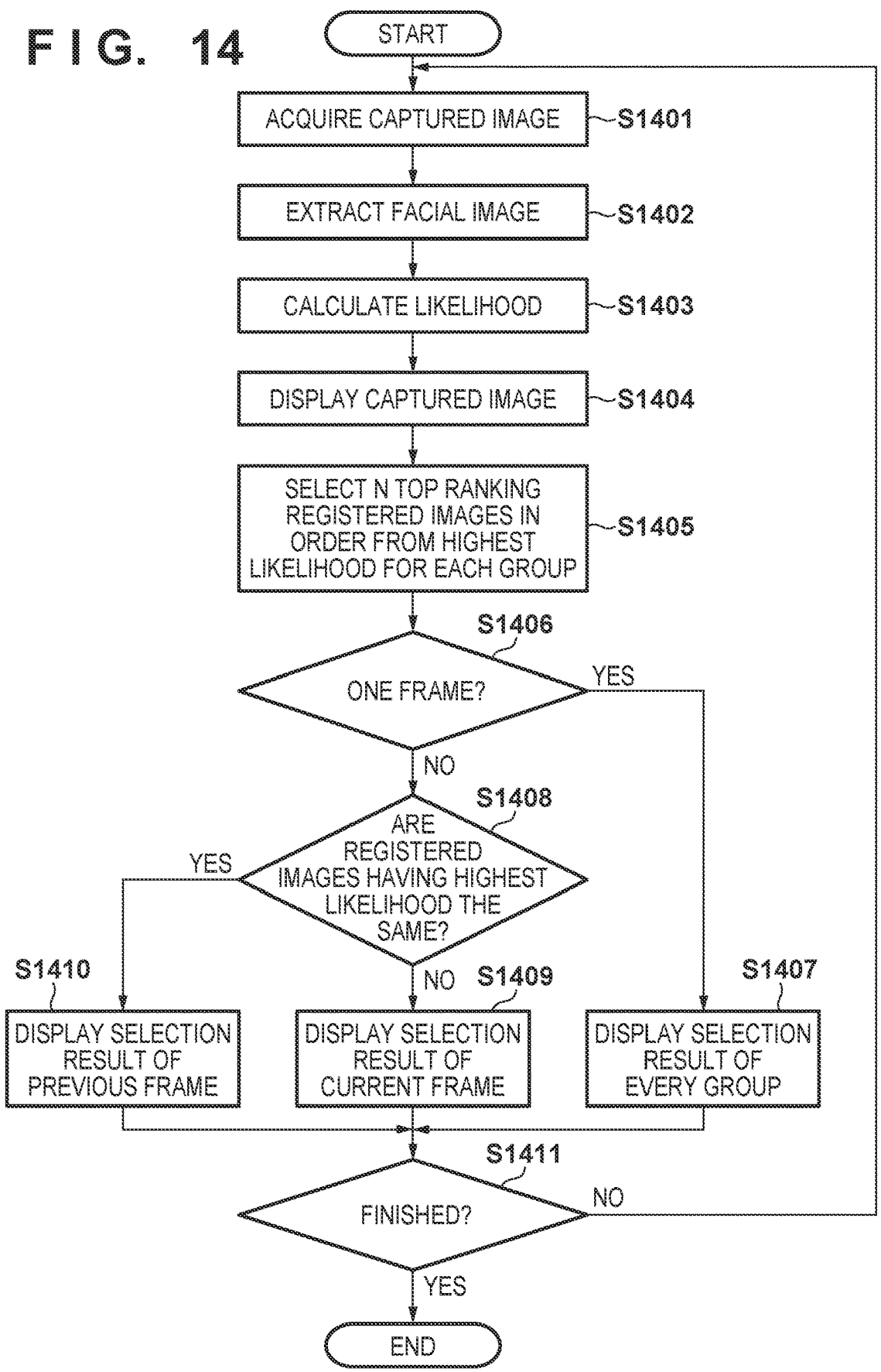
FIG. 14 is a flowchart of a processing for displaying a captured image and an authentication result.

In step S1406, the controller 199 determines whether the captured image acquired in step S1401 is the captured image of the first frame (the captured image acquired by the acquisition unit 103 at first after the start of the processing in accordance with the flowchart of FIG. 14). As the result of the above determination, in a case where the captured image acquired in step S1401 is the captured image of the first frame, the processing proceeds to step S1407, while in a case where the captured image acquired in step S1401 is the captured image of the second frame or the subsequent frames, the processing proceeds to step S1408.

In step S1407, the controller 199 performs display of the selection result for each of the groups in the display area (the display 106) for which the position and size is determined in step S805 as the authentication result for the facial image extracted from the captured image in step S1402. For example, as illustrated in FIG. 8, as the authentication result for each of the groups within a display area 4000 on the captured image 3003, the group name (Group), registered images (TOP 3) with likelihood ranking of 1 to 3, the image names (A to J) of the registered images, and the likelihood ranking (1 to 3) of the registered images.

Figure 8:
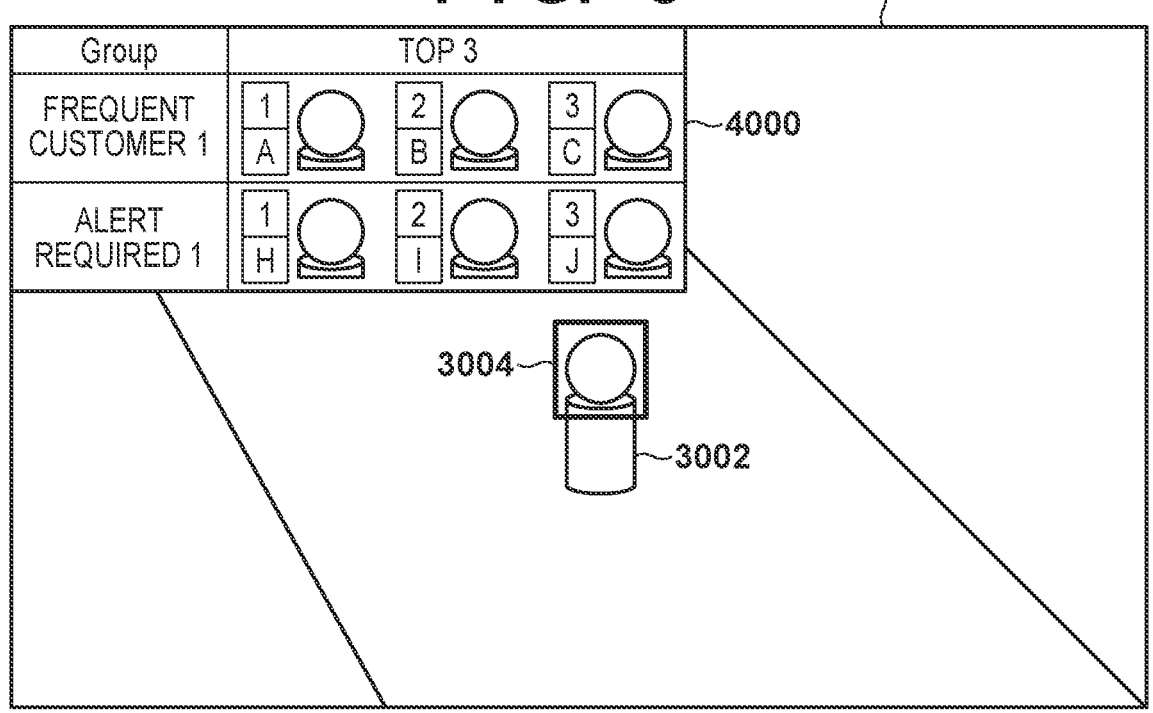
FIG. 8 is a diagram illustrating an example of display in step S1407.

In FIG. 8, the authentication result displayed is superimposed on the captured image; however, the authentication result may be displayed at a display area other than the captured image in one display screen. In case where a plurality of display screens are provided, the authentication result may be displayed on a display screen other than the display screen displaying the captured image.

In step S1408, the determination unit 111 performs comparison of the selection result in the current frame and the selection result in a frame (previous frame) previous to the current frame. Here, the frame is, as a previous frame, a frame being one frame before (previous to) the current frame, and may be a frame being two or more frames before (previous to) the current frame. Then, the determination unit 111 determines, for each of the groups, whether the registered images having the highest likelihood between the current frame and the previous frame are the same as each other or different from each other. Then, in accordance with a determination that the result for each of the groups is "the registered images having the highest likelihood between the current frame and the previous frame are the same as each other", then, the processing proceeds to step S1410. In accordance with a determination that the result for at least one group is "the registered images having the highest likelihood between the current frame and the previous frame are different from each other", then, the processing proceeds to step S1409. Furthermore, determination unit 111 may determine that "the registered images having higher rank of likelihood between the current frame and the previous frame are the same as each other as well as the highest likelihood."

FIG. 9 illustrates an example of the likelihood of each of the registered images determined in step S1403 for the previous frame (on the left side of FIG. 9) and the likelihood of each of the registered images determined in step S1403 for the current frame (on the right side of FIG. 9).

As illustrated on the left side of FIG. 9, in the previous frame, the registered images with the likelihood ranking of 1 to 3 among the registered images A to G belonging to the group with the group name of "Frequent Customer 1" are the registered images A to C. While, as illustrated on the left side of FIG. 9, in the previous frame, the registered images with the likelihood ranking of 1 to 3 among the registered images H to N belonging to the group of the group name of "Alert Required 1" are the registered images H to J. Therefore, as a result of performing the processing of step S1405 for the previous frame, as illustrated on the upper side of FIG. 10, the selection result corresponding to the group with the group name of "Frequent Customer 1" turns out to be the registered images A to C, while the selection result corresponding to the group with the group name of "Alert Required 1" turns out to be the registered image H to J.

As illustrated on the right side of FIG. 9, in the current frame, the registered images with the likelihood ranking of 1 to 3 among the registered images A to G belonging to the group with the group name of "Frequent Customer 1" are the registered images D, A, and B. As illustrated on the right side of FIG. 9, in the current frame, the registered images with the likelihood ranking of 1 to 3 among the registered images H to N belonging to the group with the group name of "Alert Required 1" are the registered images N, H, and I. On the other hand, as a result of performing the processing of step S1405 for the current frame, as illustrated on the lower side of FIG. 10, the selection result corresponding to the group with the group name of "Frequent Customer 1" turns out to be the registered images D, A, and B, while the selection result corresponding to the group with the group name of "Alert Required 1" turns out to be the registered image N, H, and I.

In this case, for the group with the group name of "Frequent Customer 1", the registered image having the highest likelihood in the previous frame is the registered image A, while the registered image having the highest likelihood in the current frame is the registered image D. Therefore, this group is determined as "the registered images having the highest likelihood between the current frame and the previous frame are different from each other". Further, for the group with the group name of "Alert Required 1", the registered image having the highest likelihood in the previous frame is the registered image H, and the registered image having the highest likelihood in the current frame is the registered image N. Therefore, this group is also determined as "the registered images having the highest likelihood between the current frame and the previous frame are different from each other".

In step S1409, the determination unit 111 takes the selection result determined for each of the groups in step S1405 for the current frame to be the authentication result for the facial image extracted from the captured image in step S1402. Then, the determination unit 111 performs display of the authentication result in the display area (the display 106) for which the position and size are determined in step S805.

In step S1410, the determination unit 111 takes the selection result determined for each of the groups in step S1405 for the previous frame to be the authentication result for the facial image extracted from the captured image in step S1402. Then, the determination unit 111 performs display of the authentication result in the display area (the display 106) for which the position and size are determined in step S805.

FIG. 11 illustrates a specific example of a method of determining the authentication result by the determination unit 111. On the left side of FIG. 11, there is illustrated "the selection result of each of the groups in the previous frame" illustrated on the upper side of FIG. 10. In a case where the comparison of "the selection result of each of the groups in the previous frame" and the selection result of each of the groups in the current frame results in a coincidence of the registered images having the highest likelihood for each of the groups, a method I is employed. While in a case where the comparison of "the selection result of each of the groups in the previous frame" and the selection result of each of the groups in the current frame results in a non-coincidence of the registered images having the highest likelihood in at least one group, a method II is employed.

Figure 10:
FIG. 10 is a diagram illustrating an example of a selection result in a previous frame and a current frame.

The method I, as illustrated on the upper right of FIG. 11, takes "the selection result of each of the groups in the previous frame" on the upper side of FIG. 10 to be the authentication result. The method II, as illustrated in the lower right of FIG. 11, takes "the selection result of each of the groups in the current frame" on the lower side of FIG. 10 to be the authentication result. That is, in the method I, the previously displayed authentication result continues to be displayed as is at this time as well, while in the method II, the previously displayed authentication result is updated to a new authentication result.

In step S1411, the controller 199 determines whether the termination condition of the processing in accordance with the flowchart of FIG. 14 is satisfied. For example, the controller 199 determines that the termination condition is satisfied in a case where the user operates the input unit 104 to enter an end instruction, or in a case where the processing of steps S1401 to S1410 is performed on all of the captured images from the monitoring camera 1000.

As the result of the above determination, in accordance with a determination that the termination condition is satisfied, the processing in accordance with the flowchart of FIG. 14 is completed, and in accordance with a determination that the termination condition is not satisfied, the processing proceeds to step S1401.

In this way, in First Embodiment, the registered image is updated to be displayed at the time when the highest value of the likelihood is updated, thus making it possible to easily perform a comparison between the person in the captured image and the registered images. Accordingly, this makes it possible, when visually confirming a face recognition result, to immediately and readily recognize the group to which a person having high possibility of presence belongs, and this makes it possible to perform a visual comparison of the displayed registered image and the captured image to promptly confirm whether a crucial person is present. This makes it possible to urge a prompt correspondence to a crucial person.

Modification Example

In First Embodiment, although the face of person has been described as an authentication target, the authentication target is not limited to the face of person. The layout of the authentication result to be displayed is not limited to the layout illustrated in FIG. 8. Alternatively, the display/non-display of the authentication result may be switched in accordance with user operation using the input unit 104.

Figure 1:
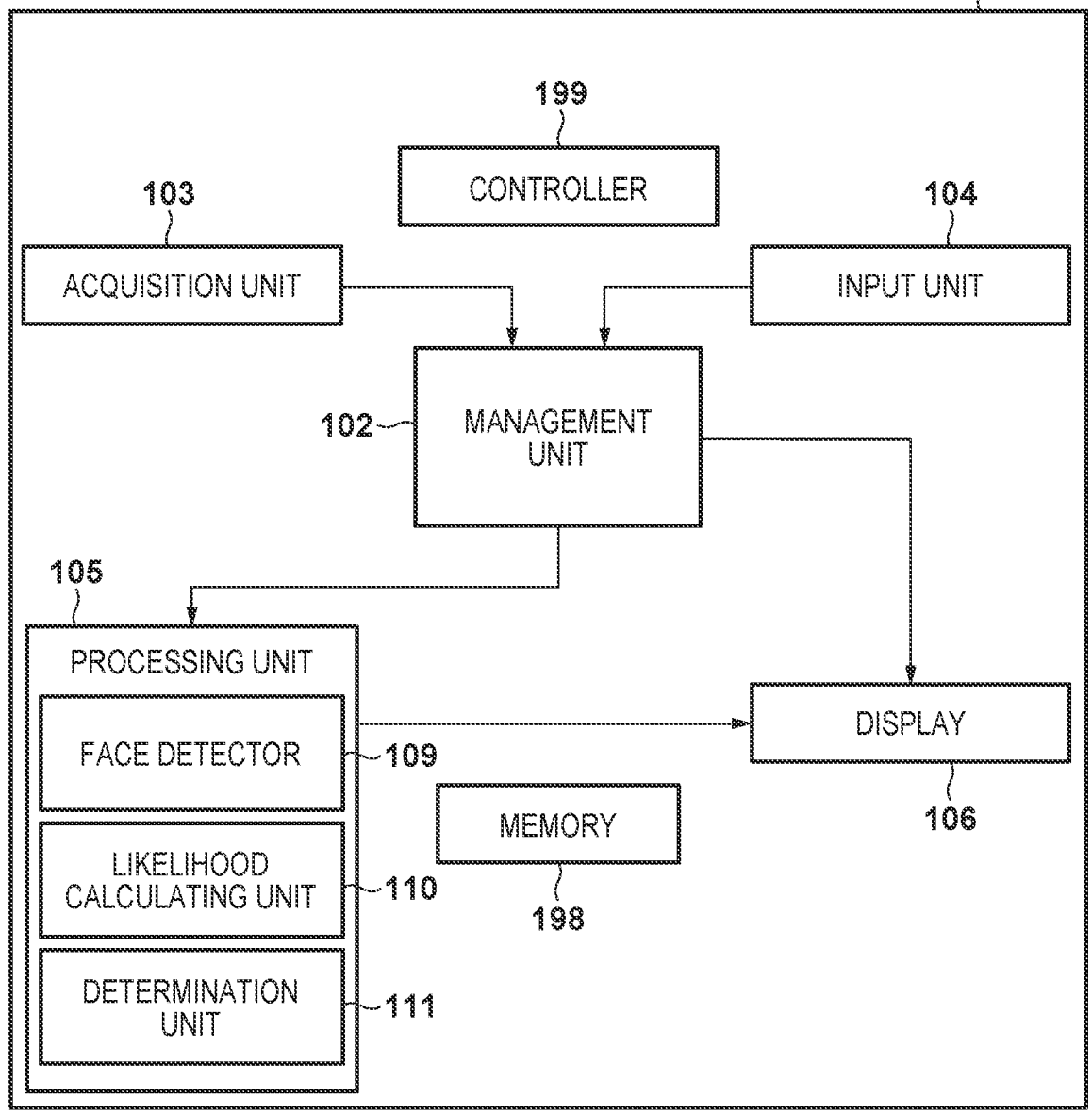
FIG. 1 is a block diagram illustrating an exemplary functional configuration of an authentication unit 2000.

Alternatively, one or more of the functional components illustrated in FIG. 1 may be apparatuses separate from the authentication unit 2000. For example, the processing unit 105 may be a separate apparatus capable of communicating with the authentication unit 2000. In this case, the processing unit 105 may be incorporated into the monitoring camera 1000 or may be a portable computer apparatus.

Second Embodiment

In First Embodiment, although a description is given such that the value of n has been set before the start of the processing in accordance with the flowchart of FIG. 14, the value of n may also be dynamically alterable after the start of the processing in accordance with the flowchart of FIG. 14. Examples of cases in which the dynamical alternation of the value of n described above is considered effective include two cases (Case 1 and Case 2) described below.

Case 1

In a case where the number of the registered images of high likelihood (e.g., of likelihood being not less than a prescribed value) is greater than the current value of n and the magnitudes of likelihood are almost the same as each other (e.g., the difference between the likelihoods is less than a prescribed value), registered images arranged in descending order of likelihood may prove that the correct person is present at or after the ranking of n-th. Thus, an alternation of n to a larger value may be of service to increase the possibility that the correct person is present in a captured image. Accordingly, in such a case, the likelihood values may be divided into a plurality of groups using an existing clustering method or the like, and then the number of registered images classified into groups having the highest likelihood may be set at n, for example. However, in general, since there is a restriction on dimensions of the display area of the registered image, it is preferred to set in advance the upper limit of the number of images to be displayed. Note that there are various methods for determining "the number of the registered images of high likelihood (e.g., of likelihood being not less than a prescribed value) is greater than the current value of n and the magnitudes of likelihood are almost the same as each other". Further, an alternation control of n may be performed in a single uniform way at all the groups, or may be performed for each of the groups.

Case 2

In case when the likelihood is low on the whole (e.g., the average value of the likelihoods is less than a prescribed value), it may occasionally be of service to alter n to a smaller value to reduce the burden of visual confirmation of the user because no correct person may be present in the registered images. In such a case, the lowest value of likelihood (lowest likelihood value) may be set in advance, and then a registered image having a likelihood less than the lowest likelihood value may be not displayed even when the likelihood ranking is not less than the current ranking of n, with a consequent reduction of the value of n.

Further, in First Embodiment, updating registered images that are displayed only when a registered image having the highest likelihood among frames changes, in displaying n pieces of registered images in descending order of likelihood, suppresses a frequent occurrence of switching of the registered images to be displayed. Nonetheless, there are cases when it is difficult to identify a person due to frequent switching of the display/non-display of the registered image to be displayed. In that case, configuration may be such that the registered image is not displayed, and only the likelihood of person of category belonging to each of the groups is displayed for the group. An example of a method for determining the "likelihood of person of category belonging to group" is described with reference to FIGS. 12A to 12C.

As illustrated in FIG. 12A, it is assumed that the registered images A, B, and C belong to a group with a group name of "Males in their 20s". Further, as illustrated in FIG. 12B, it is assumed that the likelihoods of the registered images A, B, and C to the facial image of the previous frame are $L_A^{-1}$ (=140), $L_B^{-1}$ (=10), and $L_C^{-1}$ (=80), respectively. Also, as illustrated in FIG. 12C, it is assumed that the likelihoods of the registered images A, B, and C to the facial image of the current frame are $L_A^0$ (=40), $L_B^0$ (=130), and $L_C^0$ (=20), respectively. Then, an L, which is the "likelihood of person of category belonging to group", can be determined by calculating the formula: average of the likelihoods as above $L=(L_A^{-1}+L_B^{-1}+L_C^{-1}+L_A^0+L_B^0+L_C^0)/6$, as illustrated on the lower side of FIG. 12C. Then, when the average of the likelihoods is more than a predetermined threshold, the corresponding group name is output to a display as a result. This is applicable to other groups.

Note that, although the likelihood L is herein determined using likelihoods of two frames being the frame of one frame previous to the current frame and the current frame, an average value of likelihoods of three or more frames may be determined as the L. That is, a previous frame may refer to one or more frames to determine the average value of likelihoods.

Alternatively, switching between displaying only groups (in Second Embodiment) and displaying both groups and registered images (in First Embodiment) may be performed using a scheme in which the switching is performed automatically, or may be achieved using a scheme in which the switching is performed manually by user operation. In the descriptions below, three examples of a scheme in which the switching is performed automatically are given. It is herein noted that, in order to describe distinguishing between the likelihood of each of the registered images and the likelihoods of the groups explicitly, the likelihood for each of the registered images is described as "individual likelihood", and the likelihood of person of category belonging to group is described as "group likelihood", respectively.

Example 1

Figure 17:
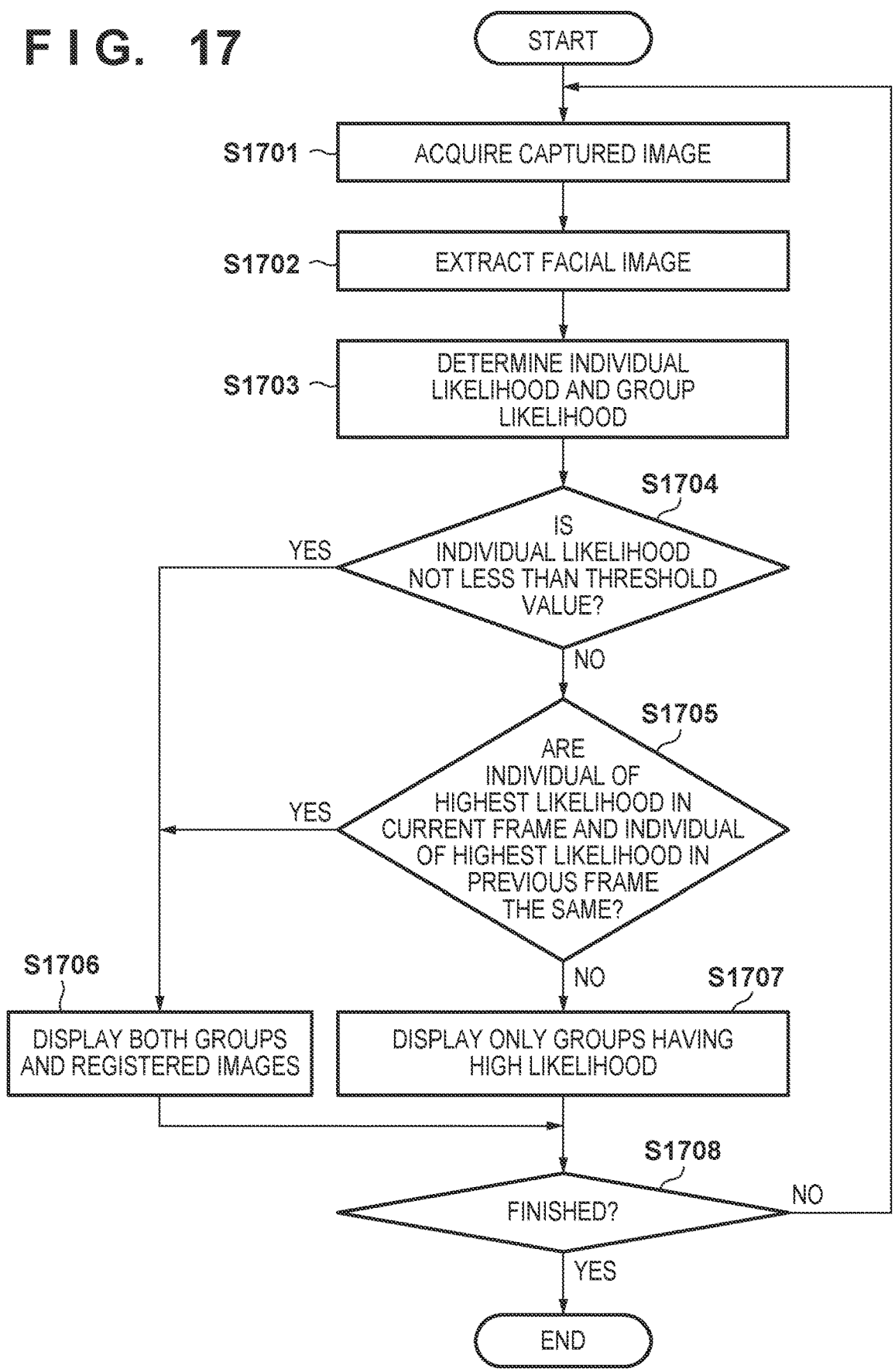
FIG. 17 is a flowchart of a processing for switching displaying based on a magnitude of an individual likelihood.

In a case where the individual likelihoods are low on the whole (e.g., the average value of likelihood is less than a prescribed value), there are cases when it is difficult to identify a person due to frequent switching of the display/non-display of the registered image to be displayed. In that case, it is advisable to firstly determine both individual likelihoods and group likelihoods, and to perform switching the displays based on magnitudes of the individual likelihoods. An example of a method of switching is described in accordance with the flowchart of FIG. 17 as in the flowchart illustrated in FIG. 14.

In step S1701, a captured image is acquired, and in step S1702, a facial area is extracted from the captured image. In step S1703, an individual likelihood and a group likelihood are determined. In step S1704, a comparison is performed on the magnitudes between the individual likelihood and a threshold value set in advance, where the processing proceeds to step S1706 when the individual likelihood is not less than the threshold value, and while the processing proceeds to step S1705 when the individual likelihood is less than the threshold value.

In step S1705, it is determined whether the persons of the highest likelihood are the same as each other in the current and one previous frames, when they are the same, the processing proceeds to step S1706, while when they are not the same, the processing proceeds to step S1707.

In step S1706, both the group and registered image are displayed as an authentication result. In step S1707, only groups of high likelihoods (e.g., of likelihood being not less than a prescribed value) are displayed. For example, as illustrated in FIG. 19, at the frame at the center the person has been recognized as the person D, which is different from the recognition result (the person A) of the immediately previous frame (the frame on the left-end), and the likelihood in the frame at the center is less than the threshold value, thus, a group name of "Males in their 30s" is displayed. Similarly, at the frame on the right-end the person has been recognized as the person B, which is different from the recognition result (the person B) of the immediately previous frame (the frame at the center), and the likelihood in the frame on the right-end is less than the threshold value, thus, a group name of "Males in their 30s" is displayed. Note that the group name may be another group name such as company employees, train station staff, policemen, or the like.

After the termination of the processing of step S1706 or step S1707, the processing proceeds to step S1708. In step S1708, it is determined whether the termination condition of the processing has been satisfied. In accordance with a determination that the termination condition has been satisfied, the processing is completed, and in accordance with a determination that the termination condition has not yet been satisfied, the processing returns to step S1701. Note that the above-described "one previous frame" and "immediately previous frame" are each intended to represent "one previous frame of the authentication target", and "immediately previous frame of the authentication target", respectively.

Example 2

Figure 18:
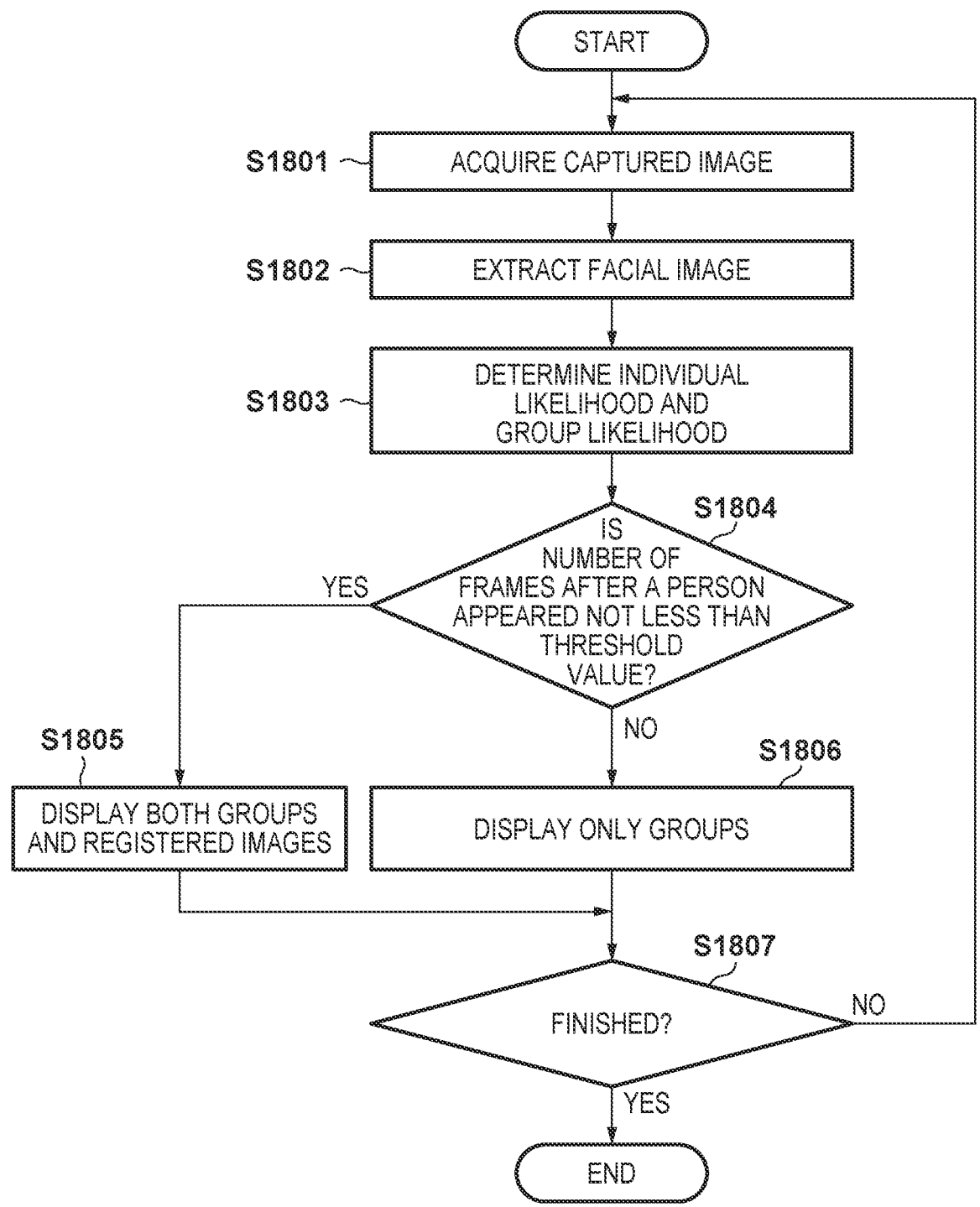
FIG. 18 is a flowchart of a processing for switching displaying based on frame number.

Although a calculation of likelihood is unstable for the initial frames at the start of authentication, the calculation may be stabilized as the amount of information increases (the number of frames increases) over time. This may be because, for example, a person initially facing backward turns to face frontward over time to be easily authenticated. In that case, for example, only groups may be displayed for the first frame in which a person appeared through the m-th frame (m is an integer of 2 or greater), and both groups and registered images may be displayed for the (m+1)-th and subsequent frames. An example of a method of switching is described in accordance with the flowchart of FIG. 18 as in the flowchart illustrated in FIG. 14.

In step S1801, a captured image is acquired, and in step S1802, a facial area is extracted from the captured image. In step S1803, an individual likelihood and a group likelihood are determined. In step S1804, a comparison is performed on the magnitudes between the number of frames after a person appeared and the threshold value set in advance, where the processing proceeds to step S1805 when the number of frames (images) after a person appeared is not less than the threshold value, while the processing proceeds to step S1806 when the number of frames is less than the threshold value.

In step S1805, both the group and registered image are displayed as an authentication result. In step S1806, only groups are displayed.

After the termination of the processing of step S1805 or step S1806, the processing proceeds to step S1807. In step S1807, it is determined whether the termination condition of the processing has been satisfied. In accordance with a determination that the termination condition has been satisfied, the processing is completed, and in accordance with a determination that the termination condition has not yet been satisfied, the processing returns to step S1801.

Example 3

The likelihoods provided in multiple frames may be integrated and switched. For example, a method may be employed such as that only groups may be displayed for the first frame through the m-th frame (m is an integer of 2 or greater), and, for the (m+1)-th and subsequent frames, a switching to a method of displaying both groups and registered images is performed at the time when the condition of "the persons having the highest likelihood are the same one another through the immediately previous consecutive n frames (n is an integer of 2 or greater) is established. Alternatively, based on the result of likelihood calculation during the immediately previous consecutive n frames, the two methods of display may be dynamically switched using a method such as displaying registered images only when the amount of change in the likelihood ranking is small.

In the First Embodiment, in displaying n registered images in descending order of likelihood, the registered image to be displayed is updated only when the registered image having the highest likelihood changes, which is, however, not a limitation. For example, the registered image to be displayed is updated when there is a group where at least one of the registered images of the likelihood ranking from the first to the third changes between frames, while the registered image is not updated when there is not such a group. In this way, a method may also be employed in which the registered image to be displayed is updated at the time when the registered images up to any (prescribed) ranking (a ranking up to the p-th highest item; p is an integer of 2 or greater) change between frames (the method II described above).

Alternatively, a method may also be employed in which, irrespective of the registered image, the registered image to be displayed is updated when there is a group where the highest likelihood in the current frame exceeds the highest likelihood during the previous frames (the method II described above), while the registered image to be displayed is not updated when there is not such a group. Alternatively, a method may also be employed in which, the registered image to be displayed is updated when there is a group where the registered image having the highest likelihood changes and the highest likelihood in the current frame exceeds the highest likelihood during the previous frames (the method II described above).

In First Embodiment, although the groups of the registered images and the registered images belonging to each of the groups are set in advance by the user, the definition of the group may be dynamically alterable based on the results of the processing. For example, in a case where the monitoring camera 1000 is used to monitor (to capture images of) a reception desk at the entrance of an event site or the like, the captured image may contain both a space of a person not yet admitted and a space of an admitted person. In such a case, the authentication unit 2000 defines each of the spaces in the captured image. Then, the authentication unit 2000 may set a group name to be displayed as an authentication result for, for example, "person requiring alert present in a space not yet admitted", when the space corresponding to the position at which the facial image has been extracted from the captured image is a "space not yet admitted".

Note that the updating of the display of the authentication result described above may be performed in groups. Further, some or all of the embodiments and modification examples described above may be used in combination as appropriate. Further, some or all of the embodiments and modification examples described above may be used in a selective manner.

Third Embodiment

Figure 16:
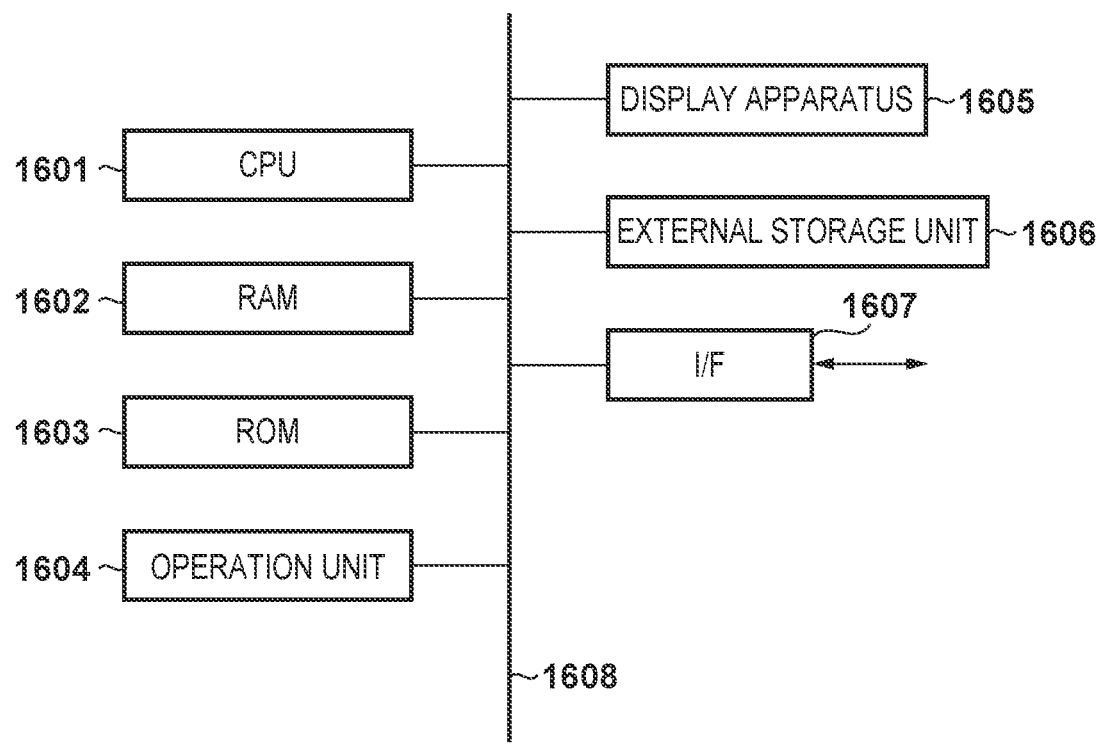
FIG. 16 is a block diagram illustrating an example of a hardware configuration of a computer apparatus.

Although the functional components illustrated in FIG. 1 may be implemented in hardware as the functions possessed by the authentication unit 2000, the part thereof may be implemented in software (computer program). In the latter case, a computer apparatus capable of executing such a computer program can be applicable to the authentication unit 2000. A hardware configuration example of a computer apparatus applicable to the authentication unit 2000 will be described using the block diagram of FIG. 16.

The CPU 1601 is configured to execute various processing using computer programs and data stored in RAM 1602. This allows the CPU 1601 to control the overall operations of the computer apparatus, as well as to perform or control the processing described above as being executed by the authentication unit 2000. The CPU 1601 is also configured to function as the controller 199 described above, for example.

The RAM 1602 includes an area for storing computer programs and data loaded from the ROM 1603 or an external storage unit 1606, and data received from an external component (e.g., the network 3000 described above) via an interface (I/F) 1607. The RAM 1602 also includes a work area that CPU 1601 uses in executing various processing. In this way, the RAM 1602 can provide various areas as appropriate. The RAM 1602 is also configured to function as the memory 198 described above.

The ROM 1603 is configured to store non-rewritable information such as setting data, startup programs, or the like for the computer apparatus.

An operation unit 1604, which is configured by a user interface such as a keyboard, mouse, touch panel, or the like, enables inputting various types of operating instructions to the CPU 1601 by user operation. The operation unit 1604 is also configured to function as the input unit 104 described above.

A display apparatus 1605 is configured with a liquid crystal screen, touch panel screen, or the like, and enables displaying the processing result from the CPU 1601 in the form of an image, text, or the like. The display apparatus 1605 is also configured to function as the display 106 described above.

The external storage unit 1606 is a large-capacity information storage apparatus represented by a hard disk drive. The external storage unit 1606 is configured to store data and computer programs that causes the CPU 1601 to execute and control the processing described above as being executed by the operating system (OS) or the authentication unit 2000. The computer program stored in the external storage unit 1606 includes a computer program that causes the CPU 1601 to perform the functions of the acquisition unit 103, the management unit 102, and the processing unit 105. The data stored in the external storage unit 1606 includes information handled as known information (the setting information, the value of n, and the like) in the above description. The computer programs and data stored in the external storage unit 1606 are loaded into RAM 1602 as appropriate in accordance with the control of the CPU 1601, and are then to be processed by the CPU 1601. Note that the external storage unit 1606 is also configured to function as the memory 198 described above.

The I/F 1607 serves as a communication interface configured to perform data communication with the network 3000 described above. The CPU 1601, the RAM 1602, the ROM 1603, the operation unit 1604, the display apparatus 1605, the external storage unit 1606, and the I/F 1607 are all connected to the bus 1608.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2018-100865, filed May 25, 2018, and No. 2019-019961, filed Feb. 6, 2019, which are hereby incorporated by reference herein in their entirety.

What is claimed is:

1. An image processing apparatus comprising:
one or more processors; and
at least one memory storing executable instructions which, when executed by the one or more processors, cause the image processing apparatus to:
sequentially acquire a frame;
calculate, for the frame, a likelihood of each of a plurality of registered images belonging to each of groups;
select, for each of the groups, a prescribed number of registered images from a top ranking in descending order of likelihood among the plurality of registered images belonging to the group as a selection result for the frame; and
output as an authentication result for a first frame captured after a second frame, based on likelihoods of the prescribed number of registered images which are included in the selection result for each of the groups for the first frame and likelihoods of the prescribed number of registered images which are included in the selection result for each of the groups for the second frame, one of the selection result for the first frame and the selection result for the second frame.

2. The image processing apparatus according to claim 1, wherein
the selection result for the second frame is output in a case where, for each of the groups, a registered image having the highest likelihood among the prescribed number of registered images included in the selection result for the first frame is identical to a registered image having the highest likelihood among the prescribed number of registered images included in the selection result for the second frame, and
the selection result for the first frame is output in a case where, for at least one group, a registered image having the highest likelihood among the prescribed number of registered images included in the selection result for the first frame is not identical to a registered image having the highest likelihood among the prescribed number of registered images included in the selection result for the second frame.

3. The image processing apparatus according to claim 1, wherein
the selection result for the second frame is output when there is no group in which registered images up to a prescribed ranking in descending order of likelihood among the prescribed number of registered images included in the selection result for the first frame are not identical to registered images up to the prescribed ranking in descending order of likelihood among the prescribed number of registered images included in the selection result for the second frame, and
the selection result for the first frame is output when there is such a group.

4. The image processing apparatus according to claim 1, wherein
the selection result for the second frame is output when there is no group in which the highest likelihood among the prescribed number of registered images included in the selection result for the first frame is greater than the highest likelihood among the prescribed number of registered images included in the selection result for the second frame, and
the selection result for the first frame is output when there is such a group.

5. The image processing apparatus according to claim 1, wherein
the prescribed number is determined based on the likelihood of each of the plurality of registered images for the first frame.

6. The image processing apparatus according to claim 1, wherein
a name of a group is output as the authentication result for the first frame, in a case where an average value of likelihood of each of the plurality of registered images within the group for the first frame and the likelihood of each of the plurality of registered images for the second frame is more than a predetermined threshold.

7. An image processing method performed by an image processing apparatus, the method comprising:

sequentially acquiring a frame;

calculating, for the frame, a likelihood of each of a plurality of registered images belonging to each of groups;

selecting, for each of the groups, a prescribed number of registered images from a top ranking in descending order of likelihood among the plurality of registered images belonging to the group as a selection result for the frame; and outputting as an authentication result for a first frame captured after a second frame, based on likelihoods of the prescribed number of registered images which are included in the selection result for each of the groups for the first frame and likelihoods of the prescribed number of registered images which are included in the selection result for each of the groups for the second frame, one of the selection result for the first frame and the selection result for the second frame.

8. The image processing method according to claim 7, wherein a name of a group is output as the authentication result for the first frame, in a case where an average value of a likelihood of each of the plurality of registered images within the group for the first frame and the likelihood of each of the plurality of registered images for the second frame is more than a predetermined threshold.

* * * * *